Aug. 10, 1937.  R. GIORDANI  2,089,889
SHEET METAL STRUCTURE FOR CYCLES
Filed Jan. 25, 1935  2 Sheets-Sheet 1
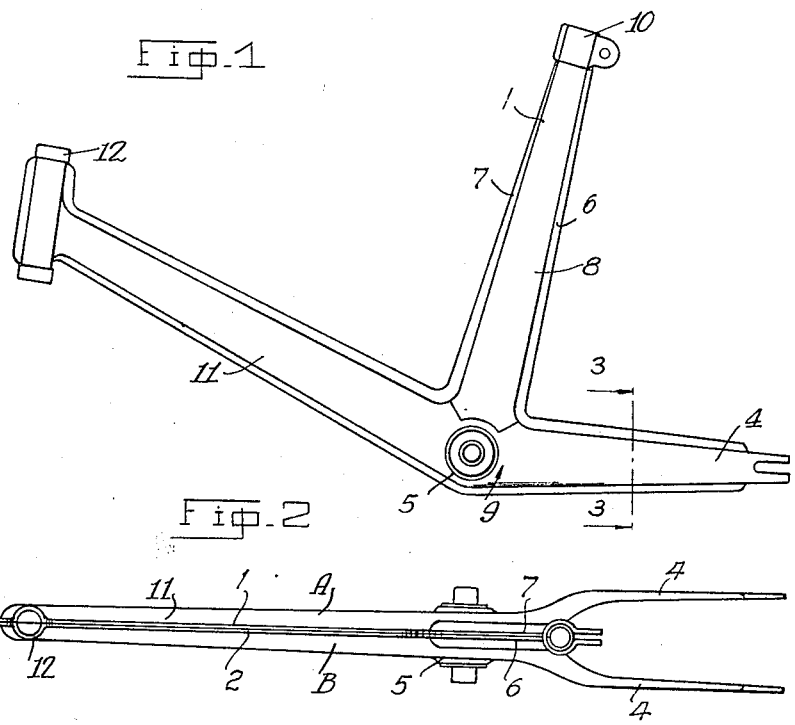
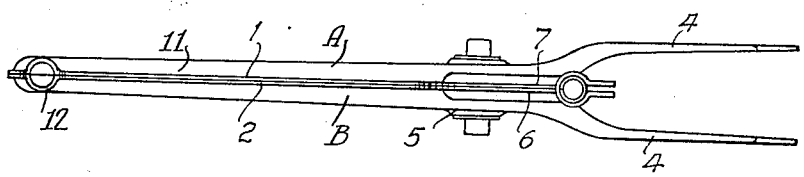
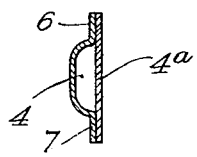
INVENTOR.
Raffaele Giordani
BY Sommers + Young
ATTORNEYS.

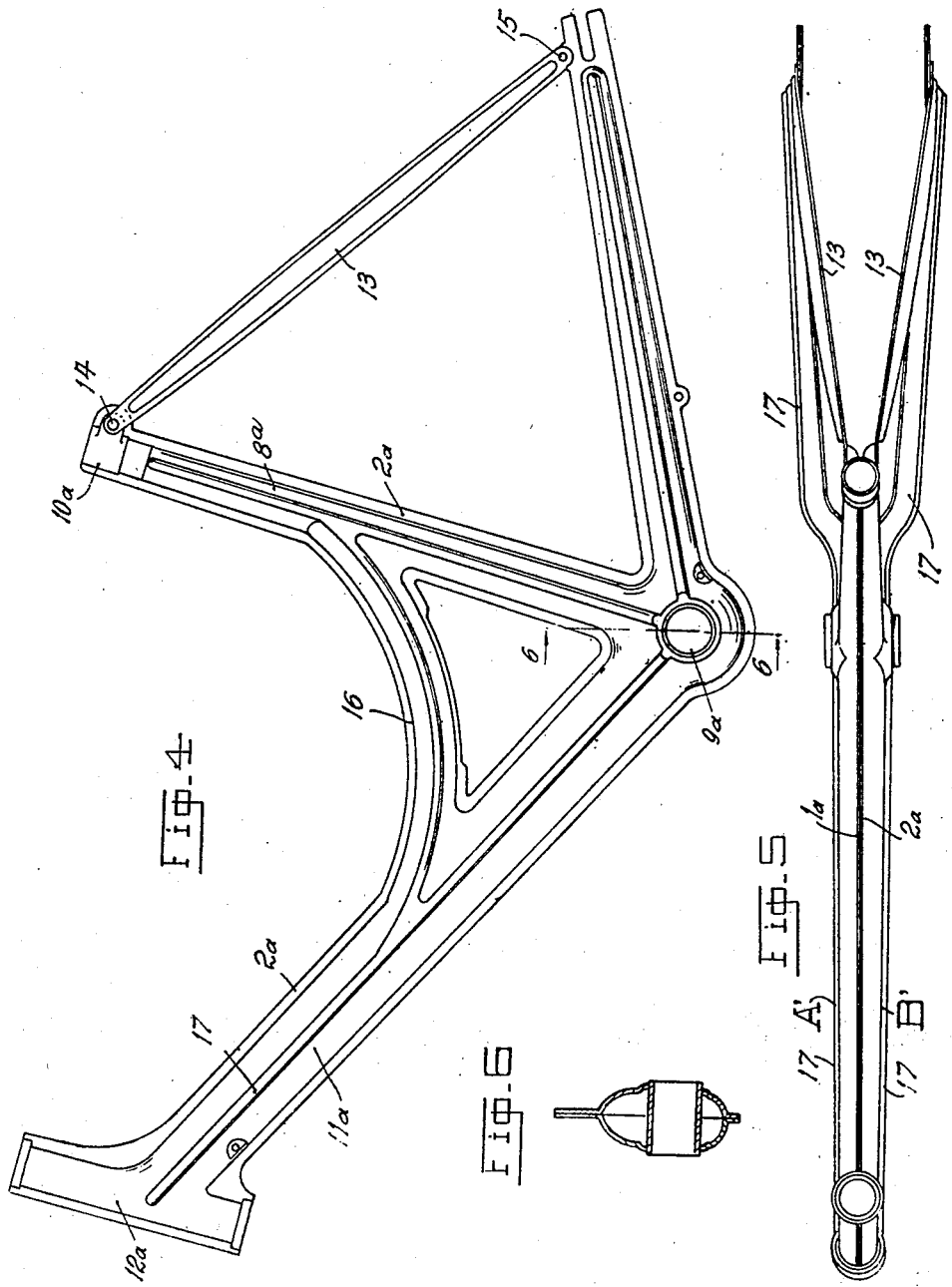

Patented Aug. 10, 1937

2,089,889

UNITED STATES PATENT OFFICE 2,089,889

SHEET-METAL STRUCTURE FOR CYCLES

Raffaele Giordani, Bologna, Italy

Application January 25, 1935, Serial No. 3,526
In Italy January 30, 1934

3 Claims. (Cl. 208—93)

The present invention relates to a sheet metal structure for cycles generally such as bicycles and tricycles especially for children, pedal luggage-carriers, etc.

The invention has for its aim to replace the metal tubes which are the fundamental elements employed in the formation of conventional cycle structures, by stamped plates, whereby an appreciable simplification in the manufacture and a more rational utilization of the material is realized owing to the fact that the various members can readily be given through bending and stamping operations, such longitudinal and transverse shapes as are most suitable for the stresses they must bear in their different sections.

By way of principle the invention consists in the fact that the members of the cycle structure comprise at least two parts obtained from sheet-metal by bending, stamping and like operations, the said parts being rigidly secured to each other by any convenient method, for instance by welding, spot-welding, folding or riveting.

According to the invention the cycle frame is preferably built up of two symmetric halves of bent or stamped plate, which are caused to lie flat on each other and are connected to each other in the manner just specified. The fork is built of a tubular length constituting the stem to which a cross piece is fixed, this piece carrying the two fork shanks and these shanks being made of two parts lying flat on each other so as to form two hollow elements of variable section and of equal resistance.

The invention will now be described in detail with reference to the accompanying drawings which show, by way of example some provided forms of the invention.

Fig. 1 is a side elevation of a cycle frame constructed in accordance with the invention;

Fig. 2 is a plan view of the form shown in Fig. 1;

Fig. 3 is a cross section along the line 3—3 in Fig. 1;

Fig. 4 is a side elevational view of a modified construction of the cycle frame;

Fig. 5 is a plan view thereof;

Fig. 6 is a cross section along the line 6—6 in Fig. 4.

Referring to Figs. 1, 2 and 3, the frame comprises two parts A and B stamped from sheet metal, the two parts being suitably shaped and having conjugated cavities. The said parts are provided with flanges 1 and 2 for connection of one part to the other. The flanges 1 and 2 extend practically the whole length of the parts A and B and are welded together (for instance electrically) or they are connected together, by welding, spot welding, or by folding, or by riveting. The shanks 4 forming the fork for reception of the rear wheel comprise (see also Fig. 3) a hollow external portion 4 and a practically flat inner portion 4a, this latter portion being fixed to the edges or flanges 6 and 7 of the external portion by one of the methods above mentioned. The member 8 leading from the central portion 9 to the saddle carrier 10 is obtained, in the example shown, by means of extensions of the cycle frame, that is, it is pressed out of the same sheet, so that the three arms forming the cycle frame constitute a single piece made of two symmetrical halves connected one to the other.

In practice, however, the member 8 may be prepared separately and then fixed to the frame by the spigot and recess, welding or other method.

The central portion 9 of each half of the cycle frame is formed with a crank axle bracket 5.

The forward member or arm 11 is formed with the seat 12 for the stem of the forward steering fork, the said seat being obtained in two halves from the respective parts of the frame.

In the modified construction according to Figs. 4, 5 and 6, A' and B' are the two symmetrical parts building up the cycle frame. In order to stiffen the rear portion of the frame, draw-members 13 are provided which are connected to the center member 8a at 14 and to the shanks of the rear fork at 15. In order to stiffen the forward portion of the frame, a connecting member 16 is provided, which is preferably formed in one with the parts A' and B' and unites the arm 11a to the center member 8a. Of course in simplified constructions, the connecting member 16 alone may be provided and the draw members 13 omitted, or conversely. In order to increase the cross strength or strength of the frame members, all conjugated parts are formed with ribs 17 projecting from the sheet-metal parts.

The tubular sections of the forks are variable and increase from the wheel end 22 up to the end 23 near the cross piece or bridge 24 of the fork. The shank ends 25 advantageously are of constant thickness in order to simplify the wheel attachment arrangement.

What I claim and desire to secure by United States Letters Patent is:

1. A frame for a bicycle or the like comprising two similar complementary frame elements each formed from sheet metal by a stamping or like operation and each consisting of a central portion formed to provide a crank axle bracket and three members radiating from said central portion, said members consisting of a rear fork member, saddle post member and forward arm member formed integrally with said central portion, the outer portions of said radiating members being free of any interconnecting means, said complementary frame elements be secured together by welding or the like.

2. In a structure according to claim 1, each of said members radiating from said central portion tapering in cross section toward the extremities thereof.

3. In a structure according to claim 1, each of said rear fork members being formed with an inwardly facing embossed recess extending longitudinally thereof and a flat plate secured to the inner face of each of said rear fork members.

RAFFAELE GIORDANI.